Nov. 4, 1969　　　　M. M. JOHNSON　　　3,475,868
STRUCTURE HAVING LIGHT CONTROLLING MEANS
Filed Dec. 4, 1967　　　　　　　　　2 Sheets-Sheet 1

INVENTOR.

BY　MARVIN M. JOHNSON

ATTORNEY

Nov. 4, 1969    M. M. JOHNSON    3,475,868
STRUCTURE HAVING LIGHT CONTROLLING MEANS
Filed Dec. 4, 1967    2 Sheets-Sheet 2

INVENTOR
MARVIN M. JOHNSON
BY
ATTORNEY

3,475,868
STRUCTURE HAVING LIGHT CONTROLLING MEANS
Marvin M. Johnson, 1103 Florence St., Colorado Springs, Colo. 80906
Filed Dec. 4, 1967, Ser. No. 687,767
Int. Cl. E04b 1/32; A01g 9/14; E04h 5/08
U.S. Cl. 52—2         10 Claims

ABSTRACT OF THE DISCLOSURE

The present invention comprises a substantially closed structure comprising an inner wall at least a portion of which is transparent to light and an outer wall, at least a portion of said outer wall being transparent to light, said transparent portions of said inner and said outer wall being in substantially coinciding relationship so that light can enter the interior of said building through at least a portion of said transparent portions, said inner and said outer wall enclosing at least one liquid-tight compartment, and means for injecting a liquid into said liquid-tight compartment to partially or completely fill said compartment, said liquid having a substantially greater opacity to light than that of said transparent portions of said inner and said outer walls. Such structures are useful as human dwellings, for horticultural purposes, and for a variety of other uses.

BACKGOUND OF THE INVENTION

Field of the invention

Various double-walled shelters have been proposed, including those of U.S. 2,649,101, and U.S. 2,782,794. The double-walled features of these structures have generally been utilized for either supporting the structure itself, e.g. by containing pressure within a pair of flexible walls; or by pulling a vacuum on a matted insulating material contained between the walls in order to form a rigid structure; or to obtain thermal insulation, e.g. by pulling a vacuum on a pair of spaced walls to reduce the heat transmission between the walls in order to minimize the heat gained or lost by the interior of the structure.

Description of the prior art

As described above, the prior art has consisted mainly of structures which utilize a double-walled principle to obtain mechanical strength or to provide insulation against the flow of heat. In preferred embodiments, the present invention can provide either or both of these features, but an important feature of the present invention is that, in addition to the control of heat transmission and the provision of structural rigidity, the invention permits control of the transmission of light through the walls of the structure.

SUMMARY

The entire walls, or at least a portion of the walls of the present invention, are comprised of material which is transparent to light. By "transparent to light" is included throughout this application, materials which may be less than completely opaque to light and which may be tinted or may be translucent as by being fluted or frosted.

The transparent portions of the inner and outer walls of the present invention substantially coincide so that closed structures of the present invention transmit light, generally sunlight, from the exterior to the interior or, in specialized circumstances, vice versa.

The double-walls of the structure of the present invention enclose liquid-tight compartments which are attached to means for injecting a liquid to partially or completely fill said compartments. The control of the transmission of light through said walls is accomplished by utilizing liquids which are more or less opaque. That is, liquids which transmit less light than do the transparent walls or portions of the walls which enclose the liquid-tight compartments. Thus, by varying the opacity of the liquids or by varying the height to which the compartments are filled with liquid, greater or lesser amounts of light may be permitted to pass through the double walls.

The liquids may be completely opaque, e.g. by dying with any of a number of common dyes of high intensity or may be merely tinted, e.g. a restful green tint to reduce transmission of sunlight in particular wave lengths which are tiring or harmful to the eyes. Various additives may be added to the liquids, e.g. ultra-violet absorbers to reduce the tanning effects of sunlight, or for other purposes.

The liquid injection systems to be used for the present invention will generally comprise a storage tank or tanks holding one or a variety of liquids, a pump and means for reversing the flow of said pump to permit the withdrawal of the fluids from the liquid-tight compartments formed by the double-walls and suitable connecting conduits. Suitable air vent valves which are capable of expelling o admitting air when desired may be provided at an upper point in the liquid-tight compartments.

The double-walls for use with the present invention may be made of either rigid, semi-rigid, or flexible materials. In the case of rigid walls these may be fabricated in sections which are welded, glued, or otherwise fastened together at the point of construction so as to form a self-supporting shelter having structural integrity.

Walls constructed of flexible materials may be hung or stretched upon a suitable rigid framework or may obtain their structural integrity from an inflatable series of ribs or stiffening members running along one or both of such flexible walls. In particularly preferred embodiments of the present invention, flexible walls are filled, or partially filled, under slight pressure with liquids so as to form self-supporting filled envelopes.

The entire structure need not be manufactured of the double-walled construction, but segments of double-walls may be alternated with rigid walls of conventional materials, e.g. frame construction, brick, or corrugated materials. Thus, windows or skylights may be provided. Further, the double-walled light-transmission control devices of the present invention may be utilized in existing buildings, e.g. by replacement of conventional windows, skylights, etc.

As discussed previously, the present invention may be utilized with means for reducing the transmission of heat or for providing structural rigidity. In preferred embodiments, three walls may be utilized and the annulus which is not filled with liquid may be filled with either a vacuum (in the case of rigid walls or flexible walls which are suitably stiffened or spaced apart so as to not collapse together when the space between them is evacuated) or the second annular space may be filled with a gas having low thermal conductivity, e.g. a chlorofluorohydrocarbon such as $CF_2Cl_2$, or the third annular space may be filled with matted insulation such as fiber glass. In the latter case, all or part of the structural rigidity may be obtained by evacuating the space between two non-rigid walls so as to compress the matted insulating material and thereby imparting rigidity.

DESCRIPTION OF THE PREFERRED EMBODIMENTS

Figure 1:
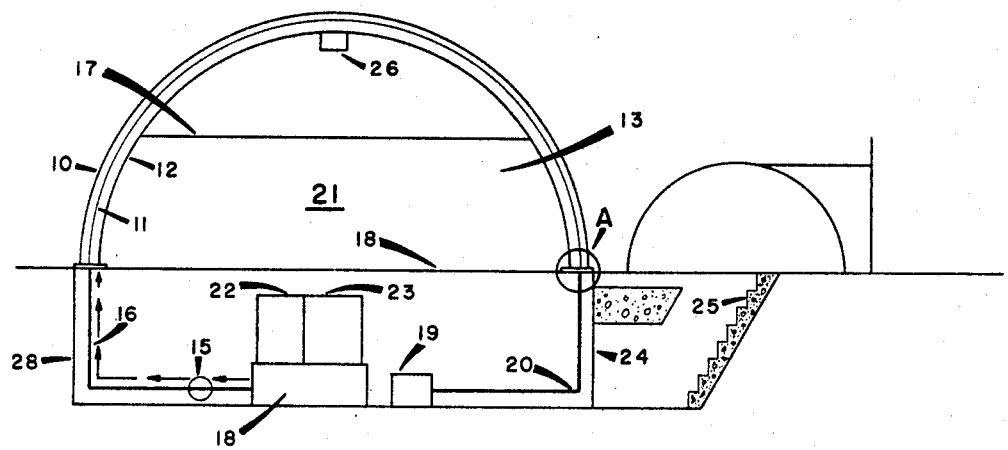
FIGURE 1 shows a preferred shelter of the present invention utilizing a tube entrance in order to provide maximum surface area of transparent wall for the admission of sunlight to the interior of the structure when desired.

In FIGURE 1 a hemispherical structure is composed of three walls 10, 11, and 12, each nested inside the other and each composed of a rigid plastic material, e.g. methyl methylacrylate which has high light transmission characteristics. Liquid 13 is pumped from storage tank 14 by pump 15 and flows through tube 16 into the annular space between walls 11 and 12. The pumping is continued until the liquid reaches a level 17 which is approximately 7 feet above the level of the floor 18. This level insures privacy and prevents excessive sun exposure of humans while still permitting a dramatic view of the sky and sufficient indirect light for reading and other normal activities. The space between walls 10 and 11 is evacuated by a vacuum pump 19 operating from a suction line 20 and this evacuated space provides a reduction in the transmission of heat into the interior 21 of the structure. Conventional air conditioning and heating means 22 and 23 are provided for use as required. A flight of stairs 25 descends to a below grade entrance 24 and suitable interior stairs and partitions are provided but not shown. A small air valve 26 permits air to escape or return to the annular space between walls 11 and 12 so as to maintain approximately atmospheric pressure in that space.

In operation, this structure is utilized as a normal dwelling place with virtually total darkness being achieved by filling the entire space between walls 11 and 12 with liquid and with complete exposure to sunlight being achieved by withdrawing all of the liquid from that space. The pump 15 is controlled by several conventional switches, e.g. pressure activated switches (not shown) which permit the liquid level 17 to be raised or lowered as desired.

Figure 2:
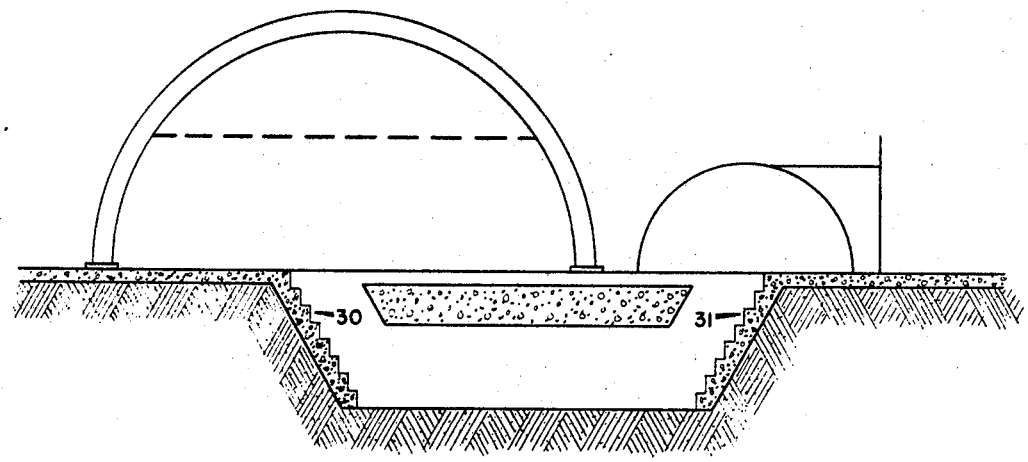
FIGURE 2 shows a shelter of the present invention having a basement.
Figure 5:
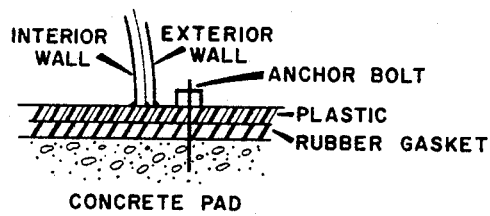
FIGURE 5 shows a structure having segmented walls with alternate segments being according to the present invention and the remainder of conventional construction.

As shown in FIGURE 5 the walls 10, 11, and 12 may be gasketed at the bottom to a simple conventional concrete footing or to the top of a basement wall such as that shown as 28 in FIGURE 1. FIGURE 2 shows a structure similar in construction to that of FIGURE 1 but utilizing a tube type entrance having steps 30 and 31 for ascending and descending.

Figure 3:
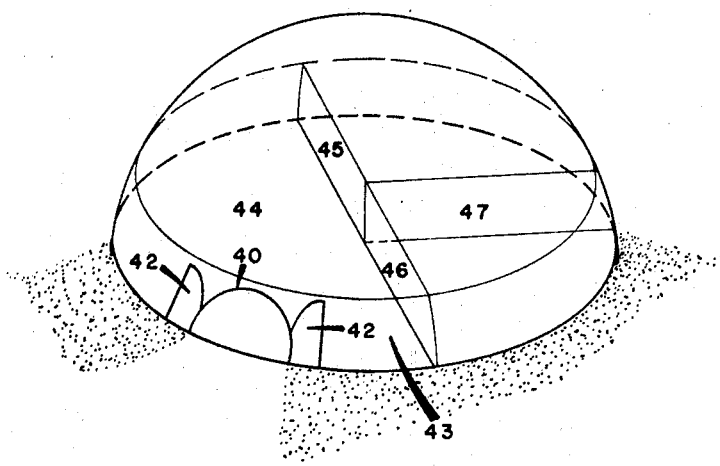
FIGURE 3 shows a detail of a triple wall of the preferred embodiment of the invention.

FIGURE 3 shows a house of the design of FIGURES 1 and 2 except that an arched front entrance 40 is provided and is closable with two doors 41 and 42 of conventional design except that they are curved to fit the contours of the exterior wall 43. Suitable partitions 44, 45, 46, and 47 are provided to divide the interior of the structure into various rooms. If desirable, these partitions may themselves be made of double-walls and may be fillable with fluid according to the techniques of the present invention.

Figure 4:
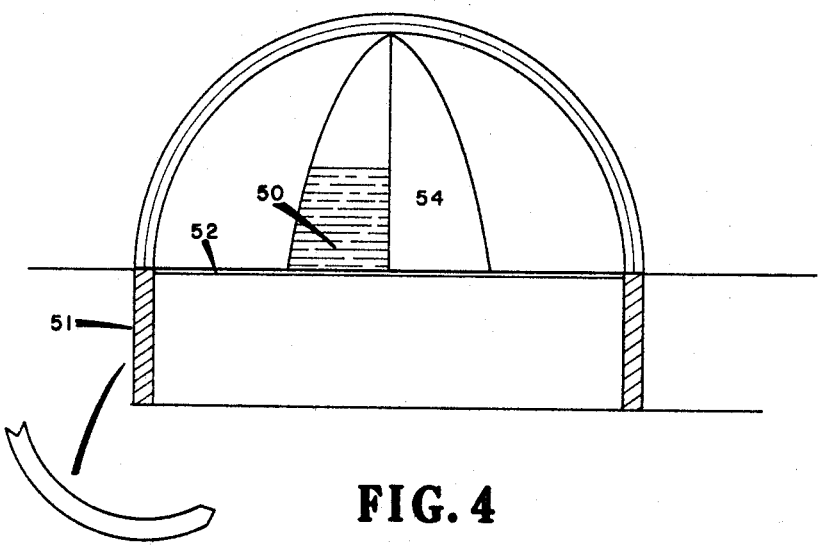
FIGURE 4 shows a preferred structure having interior partition walls.

FIGURE 4 shows a segmented house in which only segments of the walls are transparent. As before, fluids can be pumped into the liqiud-tight compartments 50 described by the double-walls of the transparent segments and the segments can be filled to any desired liquid level 50. Precast concrete floors 51 and 52 are also provided and the non-transparent segments 54 of the house are manufactured of plywood.

While the above drawings describe a hemispherical house it should be understood that this preferred hemispherical construction is not a necessary feature to the houses of the present invention and they may instead be of an entirely conventional design as to their exterior lines so long as they embody the liquid-tight transparent compartments described above. Further, there may be provided a variety of reservoirs in which different fluids are stored and a single pump may withdraw from whatever reservoir is indicated by the actuation of suitable solenoid valving. These and the many other modifications and variations of the invention which will be apparent to those skilled in the art upon a reading of the present specification should be understood to be included within the spirit of the claims appended hereto.

What is claimed is:

1. A substantially closed structure comprising (a) a first wall at least a portion of which is transparent to light, (b) a second wall, at least a portion of which is transparent to light, (c) a third wall at least a portion of which is transparent to light, said transparent portions of said walls being in substantially coinciding relationship so that light can enter the interior of said structure through at least a portion of said transparent portions, said first and said second wall enclosing at least one liquid-tight compartment, (d) a reservoir containing liquid having a substantially greater opacity to light than that of said transparent portions of said inner and outer walls, (e) transfer means operably connected to transfer said liquid between said reservoir and said liquid-tight compartment to partially or completely fill said compartment, (f) a fluid tight compartment enclosed by said second and said third walls, (g) low thermal conductivity fluid substantially filling said fluid tight compartment.

2. The structure of claim 1 wherein said inner and said outer walls are flexible and are supported by fluids maintained in the space between the walls.

3. The structure of claim 1 wherein said fluid tight compartment formed in conjunction with said third wall is filled with a gas having low thermal conductivity.

4. The structure of claim 1 wherein said fluid tight compartment formed in conjunction with said third wall is evacuated to substantially below atmospheric pressure and is so designed as to prevent the collapse of the compartment on its being evacuated.

5. The structure of claim 1 wherein each of said walls is substantially concentric with each of the remaining walls.

6. The structure of claim 1 wherein each of said walls is substantially concentric with each of the remaining walls.

7. The structure of claim 4 wherein each of said walls is substantially concentric with each of the remaining walls.

8. The structure of claim 5 wherein each of said walls comprises a hemisphere.

9. The structure of claim 6 wherein each of said walls comprises a hemisphere.

10. The structure of claim 7 wherein each of said walls comprises a hemisphere.

References Cited

UNITED STATES PATENTS

| 2,499,478 | 3/1950 | Feser | 52—293 X |
|---|---|---|---|
| 2,501,418 | 3/1950 | Snowden | 52—171 X |
| 2,649,101 | 8/1953 | Suits | 52—2 |
| 2,782,794 | 2/1957 | White | 52—2 |
| 2,967,494 | 1/1961 | Rosenfeld | 52—169 X |
| 3,192,575 | 7/1965 | Rosenau et al. | 52—171 |
| 3,195,310 | 7/1965 | Schroeder | 52—169 X |
| 3,213,628 | 10/1965 | Serota | 52—2 X |
| 3,229,429 | 1/1966 | Conrad | 52—2 |

FRANK L. ABBOTT, Primary Examiner

SAM D. BURKE III, Assistant Examiner

U.S. Cl. X.R.

52—80, 169, 168